(12) United States Patent
Tsushima et al.

(10) Patent No.: US 11,624,805 B2
(45) Date of Patent: Apr. 11, 2023

(54) FAILURE DETECTION DEVICE, FAILURE DETECTION METHOD, AND FAILURE DETECTION PROGRAM

(71) Applicant: Mitsubishi Electric Corporation, Tokyo (JP)

(72) Inventors: Naoyuki Tsushima, Tokyo (JP); Masahiko Tanimoto, Tokyo (JP); Masahiro Abukawa, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 576 days.

(21) Appl. No.: 16/488,857

(22) PCT Filed: Mar. 7, 2017

(86) PCT No.: PCT/JP2017/008967
§ 371 (c)(1),
(2) Date: Aug. 26, 2019

(87) PCT Pub. No.: WO2018/163277
PCT Pub. Date: Sep. 13, 2018

(65) Prior Publication Data
US 2021/0141054 A1    May 13, 2021

(51) Int. Cl.
*G01S 7/40* (2006.01)
*G01S 13/86* (2006.01)
(Continued)

(52) U.S. Cl.
CPC ............ *G01S 7/40* (2013.01); *G01S 13/867* (2013.01); *G01S 13/931* (2013.01); *G01S 17/86* (2020.01);
(Continued)

(58) Field of Classification Search
None
See application file for complete search history.

(56) References Cited

U.S. PATENT DOCUMENTS 6,127,964 A * 10/2000 Kageyama ............ G01S 13/931
342/70
6,438,491 B1 * 8/2002 Farmer ................. G01S 13/931
701/301
(Continued)

FOREIGN PATENT DOCUMENTS

JP   10-213650 A   8/1998
JP   2002-062352 A   2/2002
(Continued)

OTHER PUBLICATIONS

International Search Report for PCT/JP2017/008967 dated May 23, 2017 [PCT/ISA/210].
(Continued)

*Primary Examiner* — Bernarr E Gregory
(74) *Attorney, Agent, or Firm* — Sughrue Mion, PLLC; Richard C. Turner

(57) ABSTRACT

A failure detection apparatus (10) acquires, as target data, sensor data output in a past reference period by a sensor (31), such as a millimeter wave radar or LiDAR (Light Detection And Ranging), mounted on a moving body (100). The failure detection apparatus (10) determines whether detected data indicating a characteristic of a detected object indicated by normal data, which is sensor data output when the sensor (31) is normal, is included in the acquired detected data in the past reference period. In this way, the failure detection apparatus (10) determines whether a failure has occurred in the sensor (31).

11 Claims, 12 Drawing Sheets

(51) Int. Cl.
*G01S 13/931* (2020.01)
*G01S 17/86* (2020.01)
*G01S 17/931* (2020.01)
*G07C 5/08* (2006.01)
*G01S 13/00* (2006.01)
*G01S 17/00* (2020.01)

(52) U.S. Cl.
CPC .......... *G01S 17/931* (2020.01); *G07C 5/0808* (2013.01); *G07C 5/0816* (2013.01); *G01S 2013/9323* (2020.01)

(56) References Cited

U.S. PATENT DOCUMENTS 10,094,671 B2 * 10/2018 Kondo ................ G01S 19/48
2007/0013497 A1 * 1/2007 Watanabe ............. G01S 13/931
340/435

FOREIGN PATENT DOCUMENTS

| | | |
|---|---|---|
| JP | 2004-198159 A | 7/2004 |
| JP | 2008-060874 A | 3/2008 |
| JP | 2009-146086 A | 7/2009 |
| JP | 2010-211504 A | 9/2010 |
| JP | 2011-048641 A | 3/2011 |
| JP | 2012-098117 A | 5/2012 |
| JP | 5018444 B2 | 9/2012 |

OTHER PUBLICATIONS

Office Action for JP 2017-544371 dated Oct. 18, 2017.
Office Action dated Dec. 2, 2022 in Chinese Application No. 201780087778.2.

* cited by examiner

FAILURE DETECTION DEVICE, FAILURE DETECTION METHOD, AND FAILURE DETECTION PROGRAM

CROSS REFERENCE TO RELATED APPLICATIONS

This application is a National Stage of International Application No. PCT/JP2017/008967 filed Mar. 7, 2017.

TECHNICAL FIELD

The present invention relates to a technology for detecting a failure in a sensor mounted on a moving body.

BACKGROUND ART

The rise in safety awareness and the pursuit of convenience have led to an increase in automobiles equipped with a driving support function such as an emergency automatic braking function. In order to realize the driving support function, there may be a case where a sensor that emits radio waves or light, such as a millimeter wave radar or LiDAR (Light Detection And Ranging), is employed.

When the sensor for realizing the driving support function fails completely, the driving support function cannot be used. However, when an anomaly occurs only in a part of the sensing range of the sensor, as in a case where dirt or dust adheres to the sensor, a possibility exists that a detection result indicating there is no obstacle may be obtained, although there is actually an obstacle. When such a detection result is obtained, a possibility exists that the driving support function may malfunction.

Patent Literature 1 describes detection of an anomaly of a sensor by comparing a model of a normal sensing result generated based on previous driving data with an actual sensing result.

CITATION LIST

Patent Literature

Patent Literature 1: JP 2009-146086 A

SUMMARY OF INVENTION

Technical Problem

In the technique described in Patent Literature 1, an anomaly of the sensor cannot be detected except in a situation similar to that of the model generated in advance.

It is an object of the present invention to detect an anomaly of the sensor without generating a model in advance.

Solution to Problem

A failure detection apparatus according to the present invention includes:

a sensor data acquisition unit to acquire, as detected data, sensor data output in a past reference period by a sensor mounted on a moving body; and a failure determination unit to determine whether a failure has occurred in the sensor, based on whether detected data indicating a characteristic of a detected object indicated by normal data, which is sensor data output when the sensor is normal, is included in the detected data acquired by the sensor data acquisition unit.

Advantageous Effects of Invention

The present invention determines whether a failure has occurred in a sensor, based on whether detected data indicating characteristics of a detected object indicated by normal data that is output when the sensor is normal is included in detected data in a past reference period. In this way, an anomaly of the sensor can be detected without generating a model in advance.

DESCRIPTION OF EMBODIMENTS

First Embodiment

*Description of Configuration*

A configuration of a failure detection apparatus 10 according to a first embodiment will be described with reference to FIG. 1.

Figure 1:
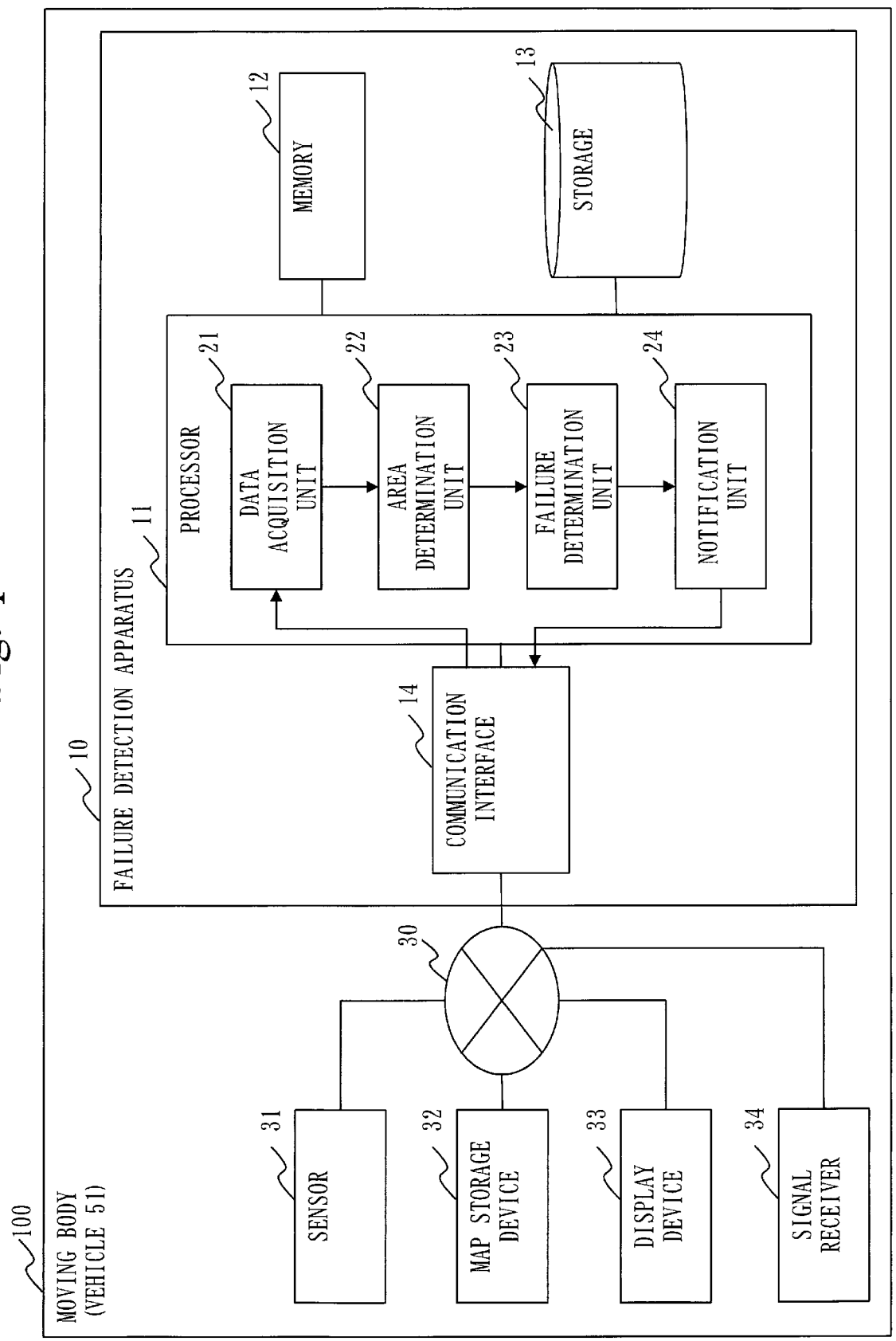
FIG. 1 is a configuration diagram of a failure detection apparatus 10 according to a first embodiment.

FIG. 1 illustrates a state in which the failure detection apparatus 10 is mounted on a moving body 100. The moving body 100 is a vehicle, a ship, or the like. In the first embodiment, the moving body 100 will be described as a vehicle 51.

Note that the failure detection apparatus 10 may be implemented in a form integrated with or in a form inseparable from the moving body 100 or another functional component that is illustrated. Alternatively, the failure detection apparatus 10 may be implemented in a detachable form or in a separable form.

The failure detection apparatus 10 is a computer.

The failure detection apparatus 10 has hardware of a processor 11, a memory 12, a storage 13, and a communication interface 14. The processor 11 is connected with other hardware components via signal lines and controls these other hardware components.

The processor 11 is an integrated circuit (IC) that performs arithmetic processing. The processor 11 is composed of registers to store instructions and information, peripheral circuits, and the like. As a specific example, the processor 11 is a central processing unit (CPU), a digital signal processor (DSP), or a graphics processing unit (GPU).

The memory 12 is a storage device to temporarily store data. As a specific example, the memory 12 is a static random access memory (SRAM) or a dynamic random access memory (DRAM).

The storage 13 is a storage device to store data. As a specific example, the storage 13 is a ROM, a flash memory, or a hard disk drive (HDD). The storage 13 may also be a portable storage medium, such as a Secure Digital (SD®) memory card, CompactFlash (CF®) data storage media, NAND flash, a flexible disc, an optical disc, a compact disc, a Blu-Ray Disc® optical disc or magneto-optical disc, or a digital versatile disc (DVD).

The communication interface 14 is an interface for communication with an external device. In the first embodiment, the communication interface 14 is an interface for communication via a network 30, such as a controller area network (CAN) or in-vehicle Ethernet installed in the vehicle 51 which is the moving body 100. As a specific example, the communication interface 14 is a port of the controller area network (CAN), Ethernet®, RS232C, or Universal Serial Bus (USB).

In the first embodiment, the communication interface 14 is connected with a sensor 31, a map storage device 32, a display device 33, and a signal receiver 34 via the network 30.

The sensor 31 is a device, such as a millimeter wave radar or LiDAR, that emits radio waves, light, sound, or the like and detects reflection by an object, thereby identifying the position and velocity of the object. In the first embodiment, the sensor 31 is assumed to be a millimeter wave radar that emits radio waves.

The map storage device 32 is a storage device such as a ROM, flash memory, or HDD that stores map data. The map data indicates road boundaries.

The display device 33 is a device that displays information, such as a liquid crystal display (LCD). The display device 33 is installed in the moving body 100 so as to be visible to a passenger such as a driver of the moving body 100.

The signal receiver 34 is a device that receives a positioning signal transmitted from a positioning satellite such as the Global Positioning System (GPS).

The failure detection apparatus 10 has, as functional components, a data acquisition unit 21, an area determination unit 22, a failure determination unit 23, and a notification unit 24. The functions of the functional components of the failure detection apparatus 10 are realized by software.

The storage 13 stores a program for realizing the functions of the functional components of the failure detection apparatus 10. This program is loaded into the memory by the processor 11 and executed by the processor 11. In this way, the functions of the functional components of the failure detection apparatus 10 are realized.

In FIG. 1, only one processor 11 is illustrated. However, the failure detection apparatus 10 may have a plurality of processors as an alternative to the processor 11. These processors share execution of the program for realizing the functions of the functional components of the failure detection apparatus 10.

\*\*\*Description of Operation\*\*\*

The operation of the failure detection apparatus 10 according to the first embodiment will be described with reference to FIGS. 2 to 12.

The operation of the failure detection apparatus 10 according to the first embodiment corresponds to a failure detection method according to the first embodiment. The operation of the failure detection apparatus 10 according to the first embodiment also corresponds to a failure detection program according to the first embodiment.

Figure 2:
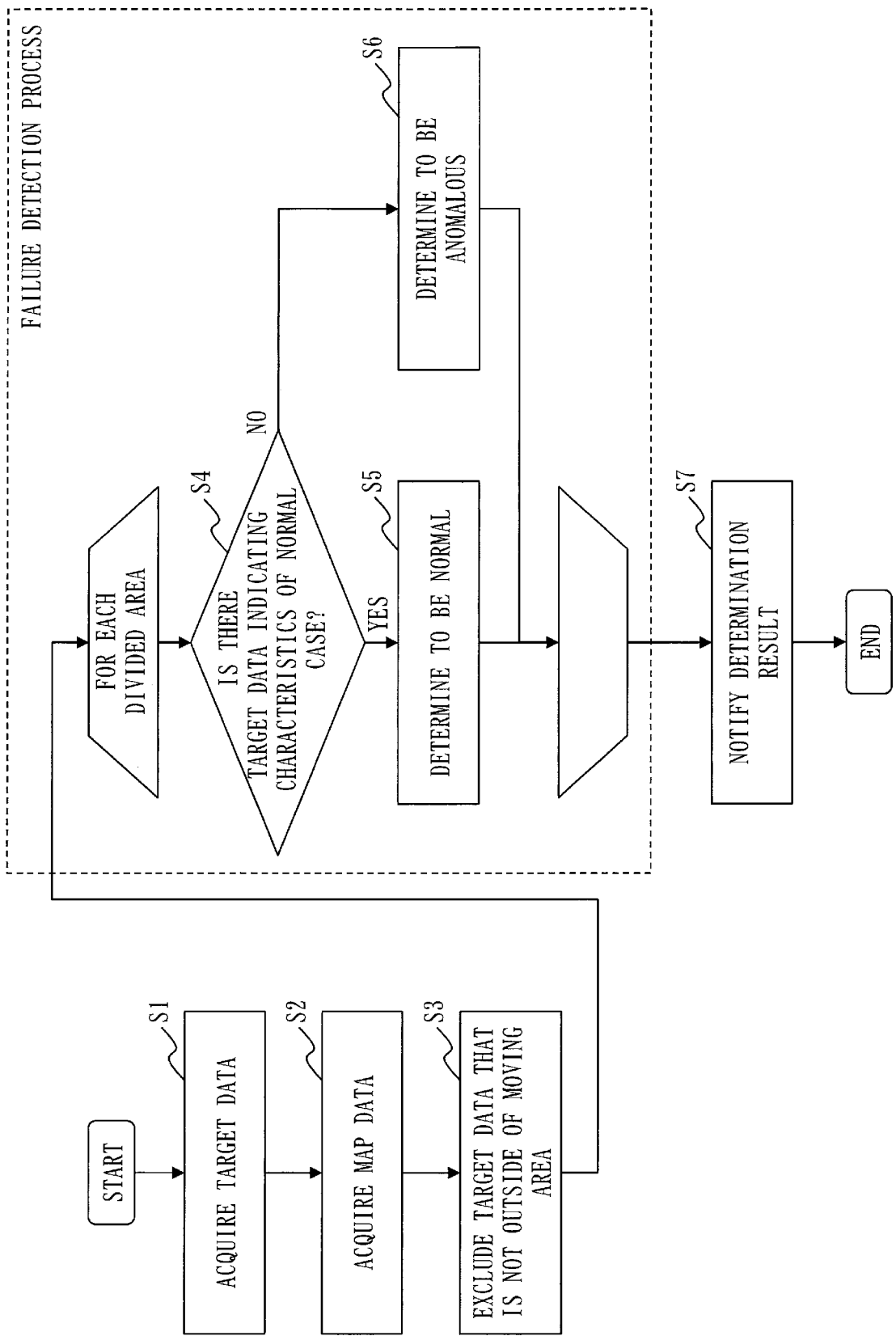
FIG. 2 is a flowchart of the operation of the failure detection apparatus 10 according to the first embodiment.

Processes illustrated in FIG. 2 are executed every reference period, such as a few minutes, while the vehicle 51 which is the moving body 100 is traveling.

(Step S1 of FIG. 2: Sensor Data Acquisition Process)

The data acquisition unit 21 acquires, as detected data, sensor data output in a past reference period by the sensor 31 mounted on the vehicle 51 which is the moving body 100, via the communication interface 14.

The sensor data is data on a detected object detected by the sensor 31. In the first embodiment, the sensor data indicates a position, a movement direction, and a movement velocity of the detected object which are relative to the vehicle 51.

(Step S2 of FIG. 2: Map Data Acquisition Process)

The data acquisition unit 21 acquires map data on an area around the position of the moving body 100 from the map storage device 32 via the communication interface 14. The position of the moving body 100 is identified based on a positioning signal received by the signal receiver 34.

(Step S3 of FIG. 2: Area Determination Process)

The area determination unit 22 compares the position of a detected object indicated by each piece of detected data acquired in step S1 with the positions of the road boundaries indicated by the map data acquired in step S2, and determines whether the position of the detected object indicated by each piece of detected data is outside the road. That is, the area determination unit 22 determines whether the position of the detected object indicated by each piece of detected data is outside the road which is a moving area where the moving body 100 moves. Then, the area determination unit 22 retains each piece of detected data determined to indicate that the detected object is outside the road, and excludes the remaining pieces of detected data.

Note that the area determination unit 22 may detect white lines which are road boundaries with a camera, and compare the positions of the detected white lines with the position of the detected object indicated by each piece of detected data acquired in step S1.

Figure 3:
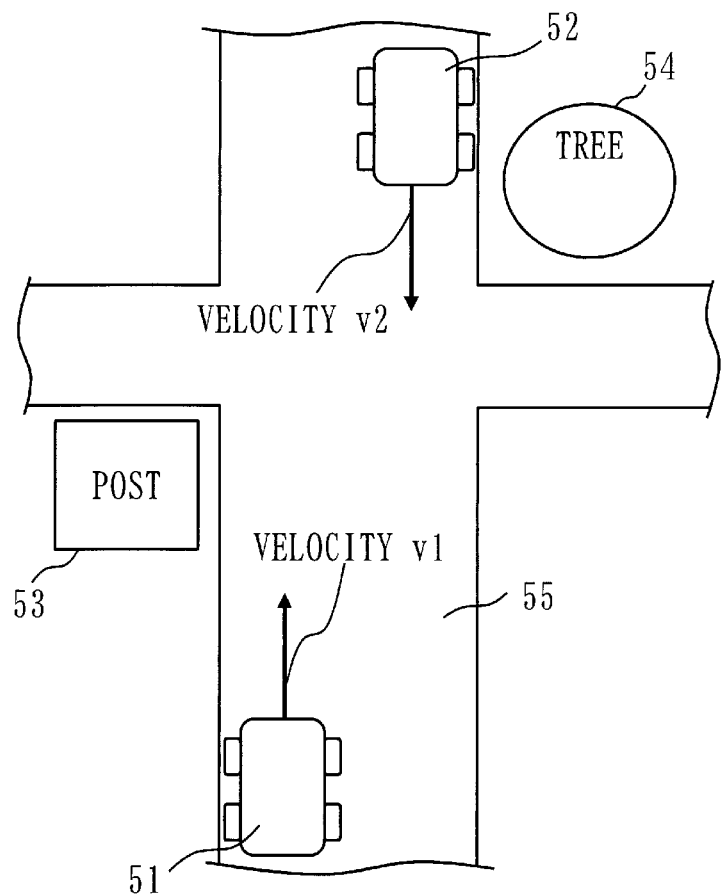
FIG. 3 is a diagram illustrating an example of a vehicle 51 and a surrounding situation.
Figure 4:
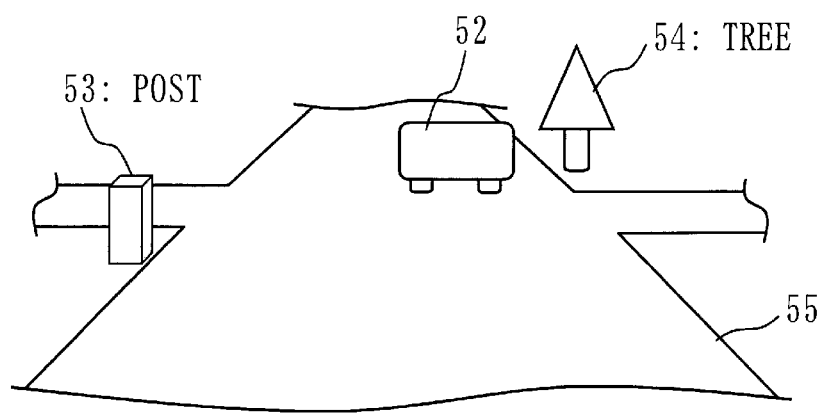
FIG. 4 is a diagram illustrating a state of the situation of FIG. 3 as seen from the vehicle 51.

For example, it is assumed that the vehicle 51 is traveling on a road 55 at a velocity v1, and a vehicle 52 is traveling in the opposite lane of the road 55 at a velocity v2 toward the vehicle 51, as illustrated in FIG. 3. It is also assumed that there are a post 53 and a tree 54 outside the road 55. Then, the vehicle 52, the post 53, and the tree 54 can be seen from the vehicle 51, as illustrated in FIG. 4.

Figure 5:
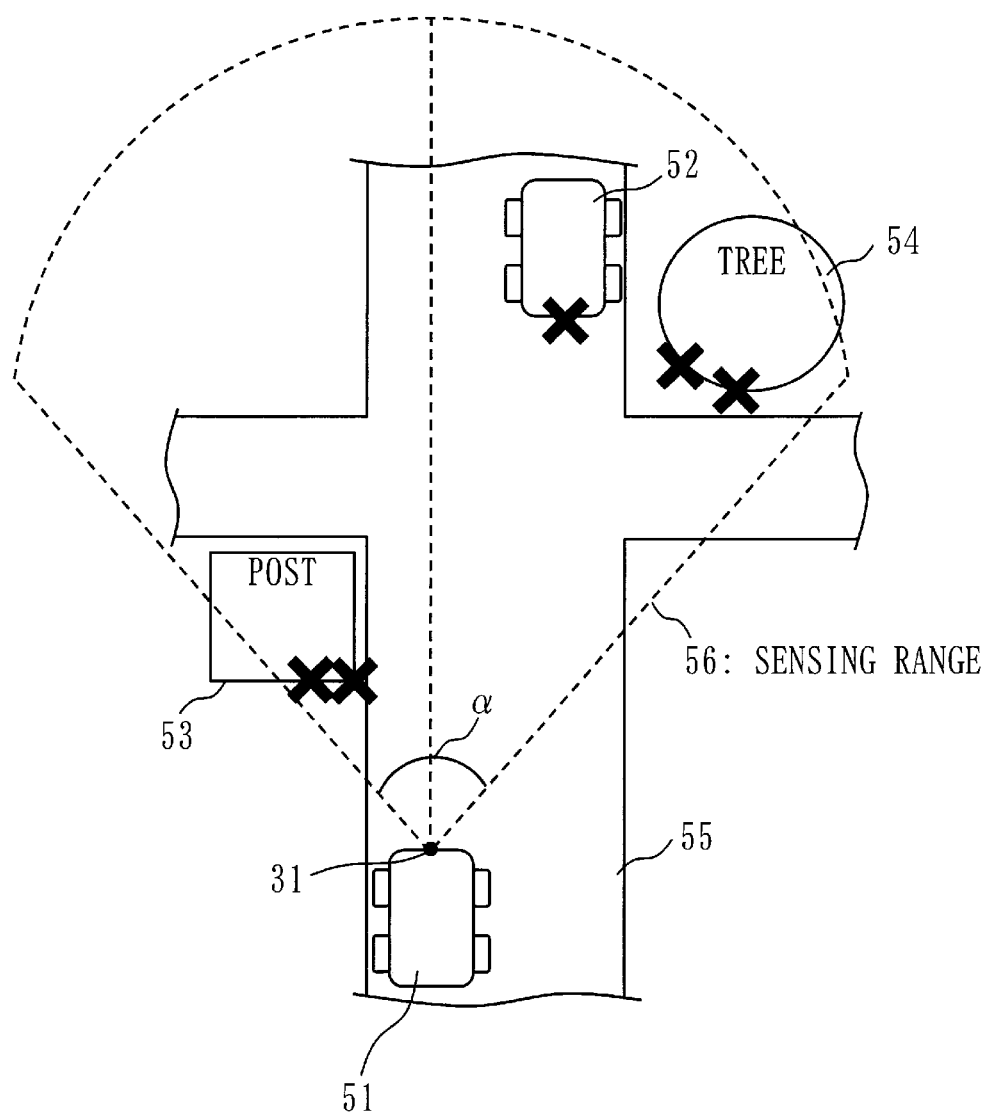
FIG. 5 is an explanatory diagram of sensing in the situation of FIGS. 3 and 4.

In this case, the sensor 31 mounted on the vehicle 51 emits radio waves toward the range of an angle α in front of the vehicle 51, and receives reflected waves which are reflection of the radio waves by detected objects within a sensing range 56, as illustrated in FIG. 5. Therefore, the sensing range 56 is a sector constituting a part of a circle centered on the sensor 31. In FIG. 5, a reflection point at which a radio wave is reflected by a detected object is indicated by X. Due to the structure of the sensor 31, reflection points exist in the range that can be seen from the vehicle 51, and no reflection point exists on the back side of a detected object that cannot be seen from the vehicle 51.

Figure 6:
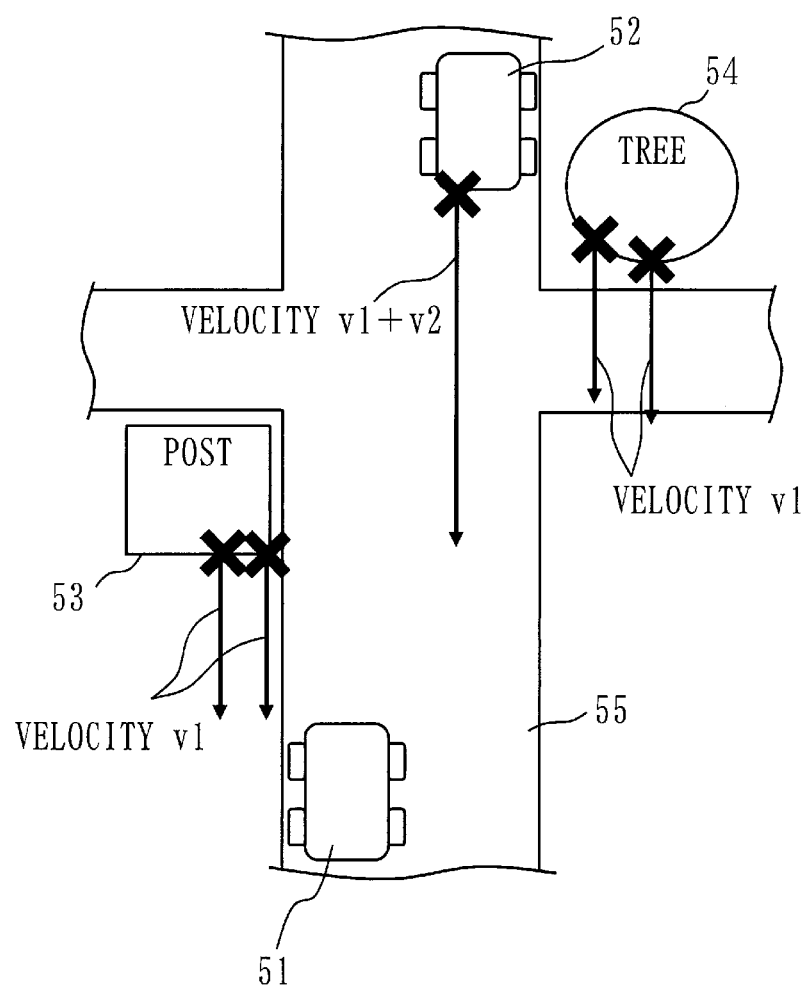
FIG. 6 is an explanatory diagram of detected data obtained in the situation of FIGS. 3 and 4.

The position of a reflection point is identified by the direction in which a radio wave is emitted and the time from the emission of the radio wave to the reception of a reflected wave. In this way, the position of the detected object relative to the vehicle 51 is identified. By analyzing and differentiating changes in the position of an identified reflection point in chronological order, or by performing an analysis using changes in the Doppler frequency of a reflected wave, the movement direction and movement velocity of the detected object which are relative to the vehicle 51 are identified. As illustrated in FIG. 6, since the post 53 and the tree 54 which are detected objects outside the road 55 do not move, they appear as if they were advancing toward the vehicle 51 at the same velocity v1 as that of the vehicle 51. The vehicle 52 which is a detected object within the road 55 appears as if it were advancing toward the vehicle 51 at v1+v2 which is a combined velocity of the velocity of the vehicle 51 and the velocity of the vehicle 52.

In the process of step S3, the positions of the post 53 and the tree 54 are determined to be outside the road which is the moving area where the moving body 100 moves.

In the examples in FIGS. 3 to 6, only limited objects of the post 53 and the tree 54 are assumed to be detected objects. In reality, however, various objects within and outside the road 55, such as grass, pebbles, and guardrails, are detected by the sensor 31 and obtained as detected data.

Next, a failure determination process of step S4 to step S6 is executed using each divided area obtained by dividing the sensing range of the sensor 31 as a target area.

Figure 7:
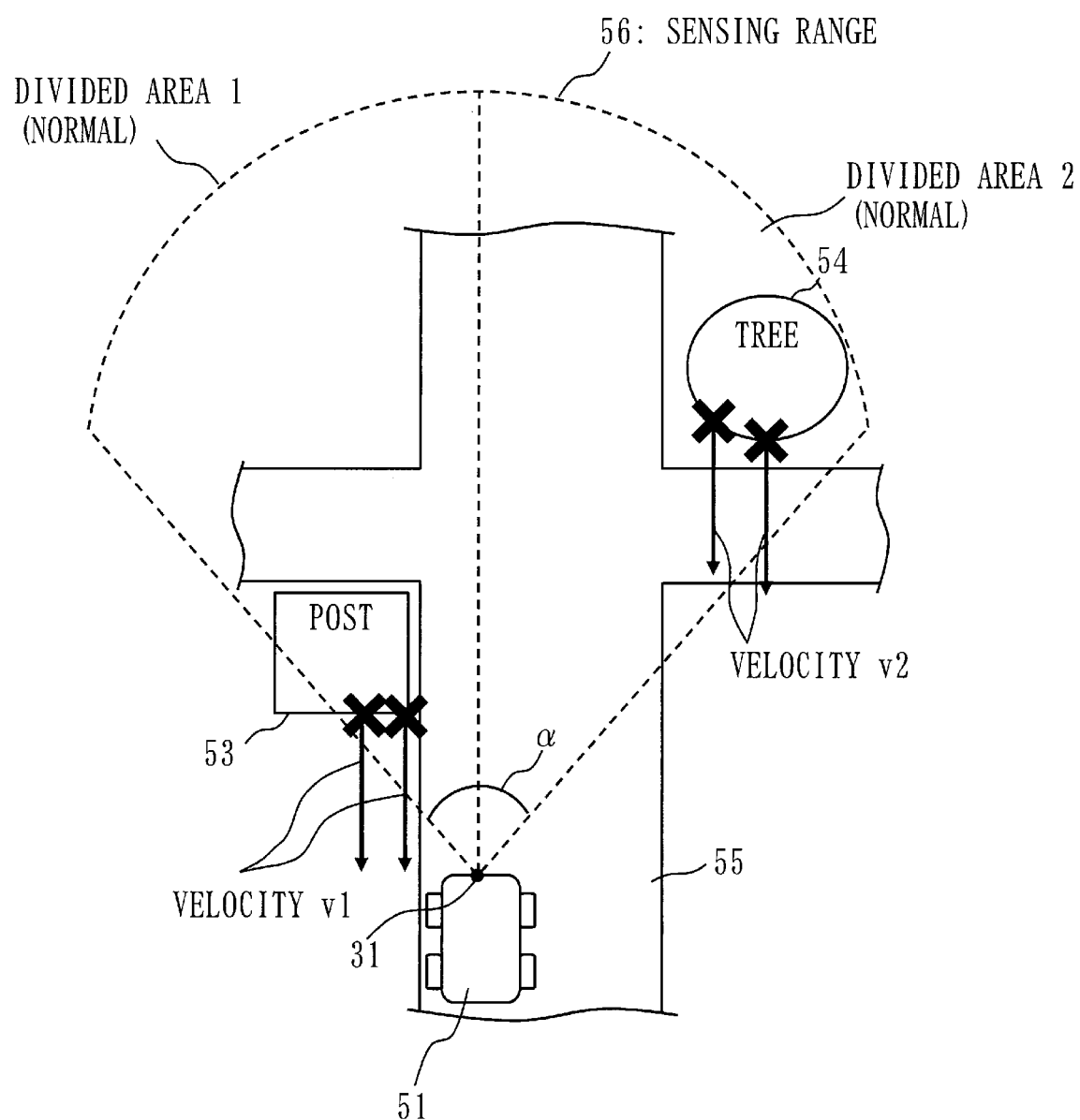
FIG. 7 is an explanatory diagram of failure determination results in the situation of FIGS. 3 and 4.

The sensing range of the sensor 31 is a sector which is a part of a circle centered on the position of the sensor 31. Here, each divided area is assumed to be a small sector obtained by dividing the central angle of the sector. For example, as illustrated in FIG. 7, the sensing range 56 is divided into two divided areas of a divided area 1 and a divided area 2 by bisecting the central angle α.

(Step S4 of FIG. 2: Characteristic Determination Process)

The failure determination unit 23 determines whether detected data indicating characteristics of a detected object indicated by normal data, which is sensor data output when the sensor 31 is normal, is included in the detected data on detected objects determined to be outside the road among the detected data in the past reference period acquired in step S1. In this way, the failure determination unit 23 determines whether a failure has occurred in the sensor 31.

If detected data indicating the characteristics of a detected object indicated by the normal data is included, the failure determination unit 23 advances the process to step S5. On the other hand, if detected data indicating the characteristics of a detected object indicated by the normal data is not included, the failure determination unit 23 advances the process to step S6.

In the first embodiment, the failure determination unit 23 determines whether detected data indicating the movement direction opposite to the movement direction of the moving body 100 and indicating the same movement velocity as the movement velocity of the moving body 100 is included in the detected data on detected objects determined to be outside the road among the detected data in the past reference period.

In this case, for example, the failure determination unit 23 identifies the movement direction of the vehicle 51 by acquiring steering angle information of the vehicle 51 from the CAN of the vehicle 51 and converting it into a tire angle of the vehicle 51. The failure determination unit 23 identifies the movement velocity of the vehicle 51 by acquiring, from the CAN, velocity information of the vehicle 51 acquired by a velocity sensor.

The identified movement direction and movement velocity are considered as a movement vector of the vehicle 51. Then, the process of the failure determination unit 23 is equivalent to a process of determining whether detected data indicating an inverse vector of the movement vector of the vehicle 51 is included.

(Step S5 of FIG. 2: Normality Determination Process)

The failure determination unit 23 determines that the operation of the sensor 31 is normal for the target area.

(Step S6 of FIG. 2: Anomaly Determination Process)

The failure determination unit 23 determines that the operation of the sensor 31 is anomalous for the target area.

It is assumed that the sensing range 56 is divided into the divided area 1 and the divided area 2, as illustrated in FIG. 7.

In this case, the divided area 1 includes the post 53. As described above, the post 53 appears as if it were advancing toward the vehicle 51 at the same velocity v1 as that of the vehicle 51. That is, the detected data about a reflection point on the post 53 is detected data indicating the movement direction opposite to the movement direction of the moving body 100 and indicating the same movement velocity as the movement velocity of the moving body 100. Therefore, for the divided area 1, the presence of detected data indicating the characteristics of the normal case is determined in step S4, and the operation of the sensor 31 is determined to be normal in step S5.

The divided area 2 includes the tree 54. As in the case of the post 53, the tree 54 also appears as if it were advancing toward the vehicle 51 at the same velocity v1 as that of the vehicle 51. Therefore, also for the divided area 2, the presence of detected data indicating the characteristics of the normal case is determined in step S4, and the operation of the sensor 31 is determined to be normal in step S5.

Figure 8:
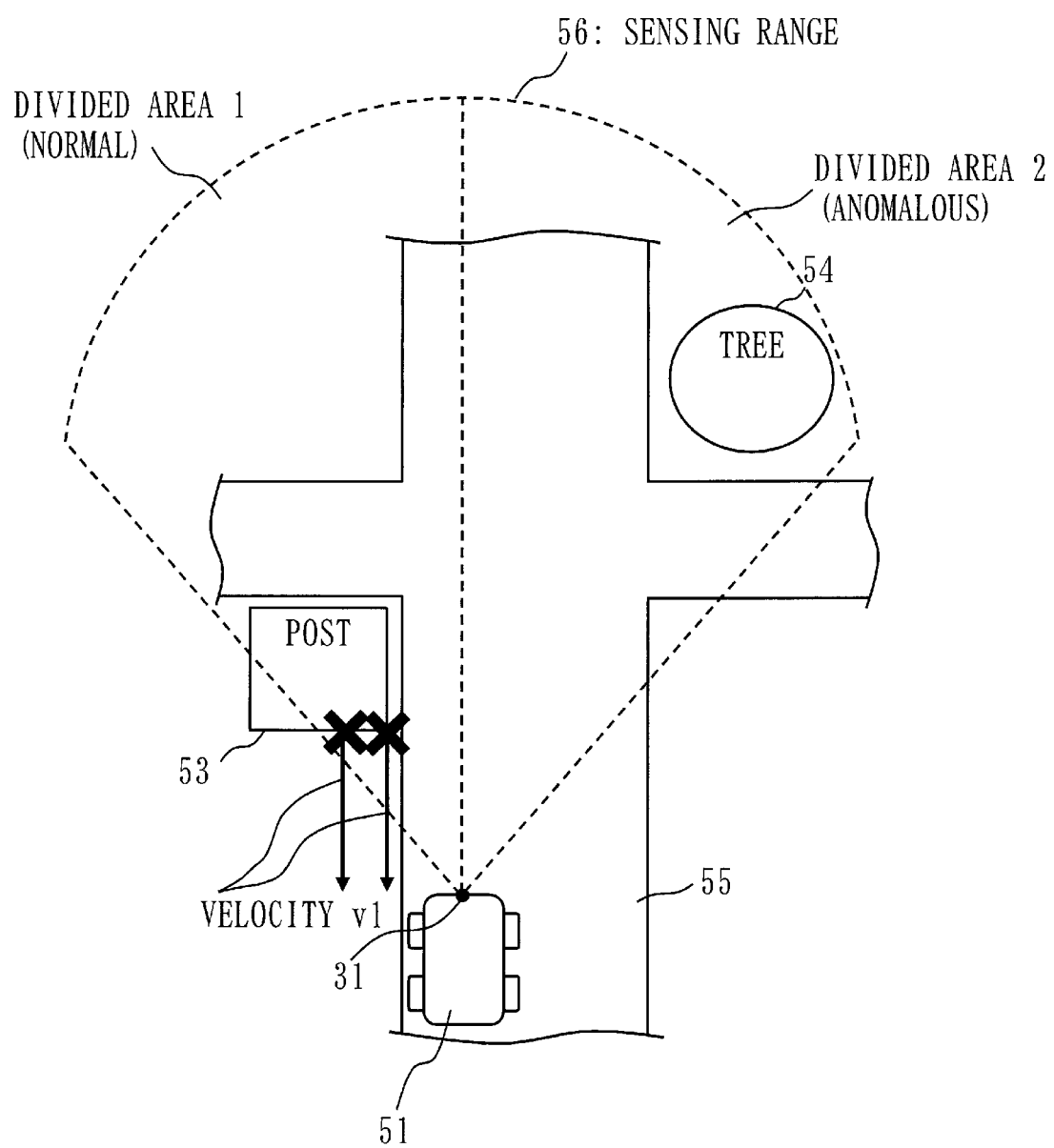
FIG. 8 is an explanatory diagram of failure determination results in the situation of FIGS. 3 and 4.

It is assumed that no reflection point on the tree 54 is detected, as illustrated in FIG. 8.

In this case, as in the case illustrated in FIG. 7, the operation of the sensor 31 is determined to be normal for the divided area 1. On the other hand, for the divided area 2, there is no detected data indicating the movement direction opposite to the movement direction of the moving body 100 and indicating the same movement velocity as the movement velocity of the moving body 100. Therefore, for the divided area 2, the absence of detected data indicating the characteristics of the normal case is determined in step S4, and the operation of the sensor 31 is determined to be anomalous in step S6.

A case where the orientation of the sensor 31 is misaligned will be described with reference to FIGS. 9 and 10. That is, the orientation of the sensor 31 is misaligned with respect to the original orientation for some reason.

Figure 9:
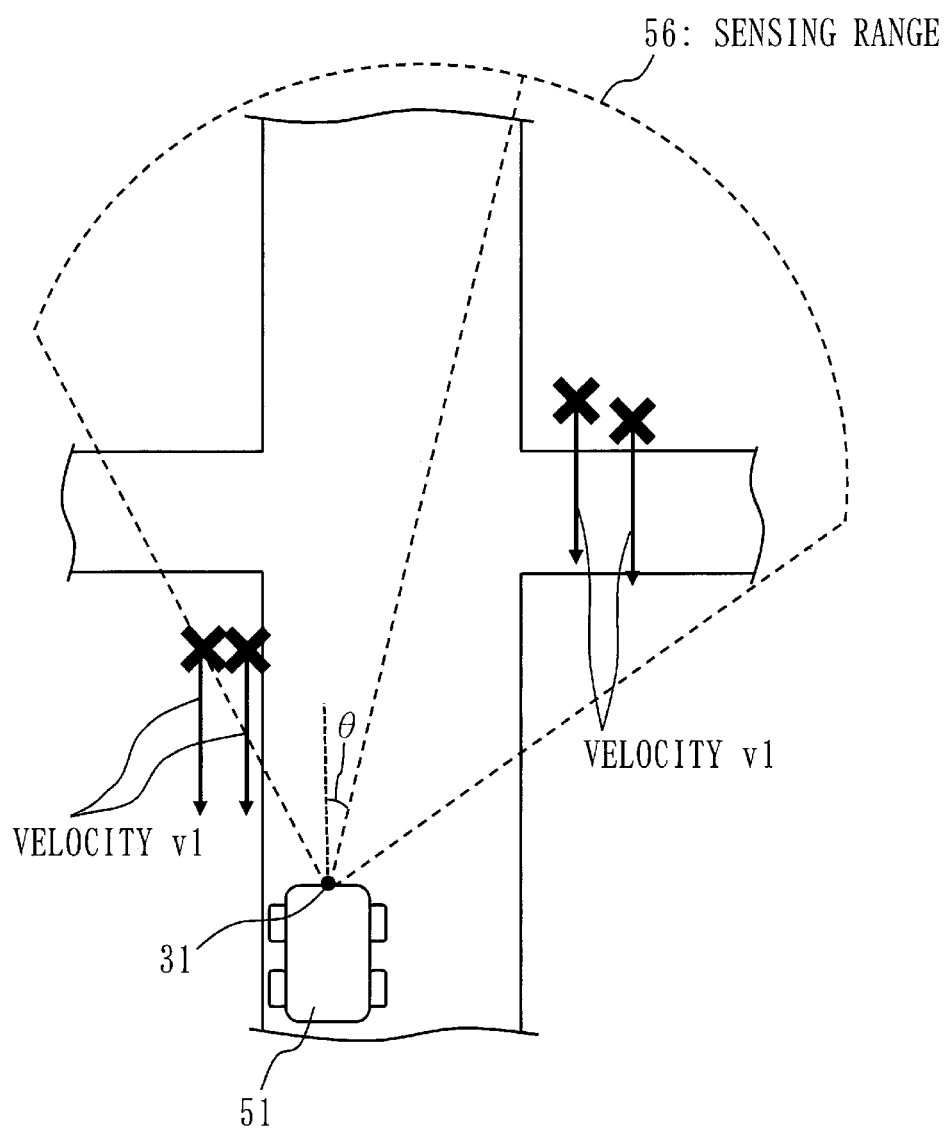
FIG. 9 is an explanatory diagram of a case where the sensor is misaligned.
Figure 10:
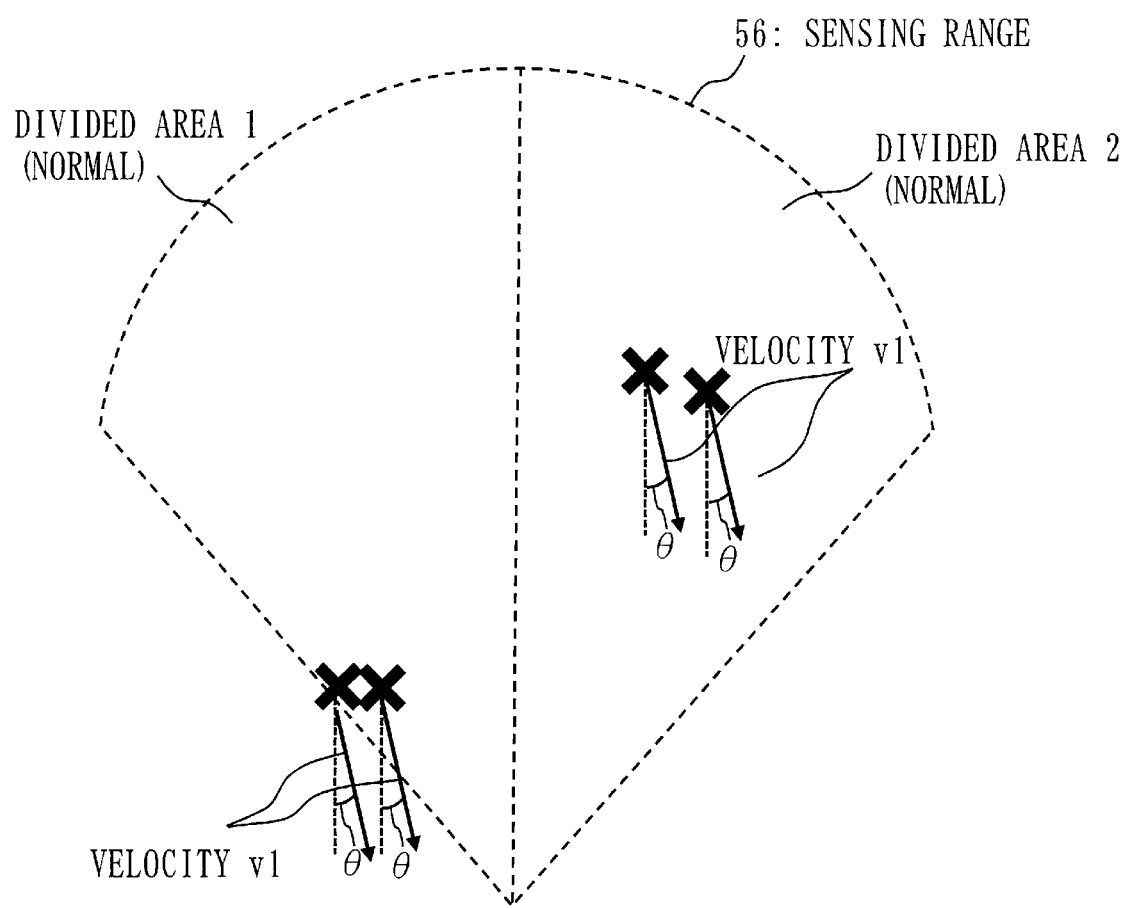
FIG. 10 is an explanatory diagram of failure determination results in the situation of FIG. 9.

It is assumed here that the sensor 31 is misaligned to the right by only an angle θ with respect to the original orientation, as illustrated in FIG. 9. Then, from the viewpoint of the vehicle 51, the movement directions of the reflection points on the post 53 and the tree 54 are recognized to be misaligned to the left by only the angle θ with respect to the direction opposite to the movement direction of the vehicle 51, as illustrated in FIG. 10. That is, the detected data about the reflection points on the post 53 and the tree 54 is not detected data indicating the movement direction opposite to the movement direction of the moving body 100.

Therefore, for the divided area 1 and the divided area 2, the absence of detected data indicating the characteristics of the normal case is determined in step S4, and the operation of the sensor 31 is determined to be anomalous in step S6. That is, also in the case where the vehicle 51 is mounted to be misaligned from the original orientation, an anomaly is determined.

Figure 11:
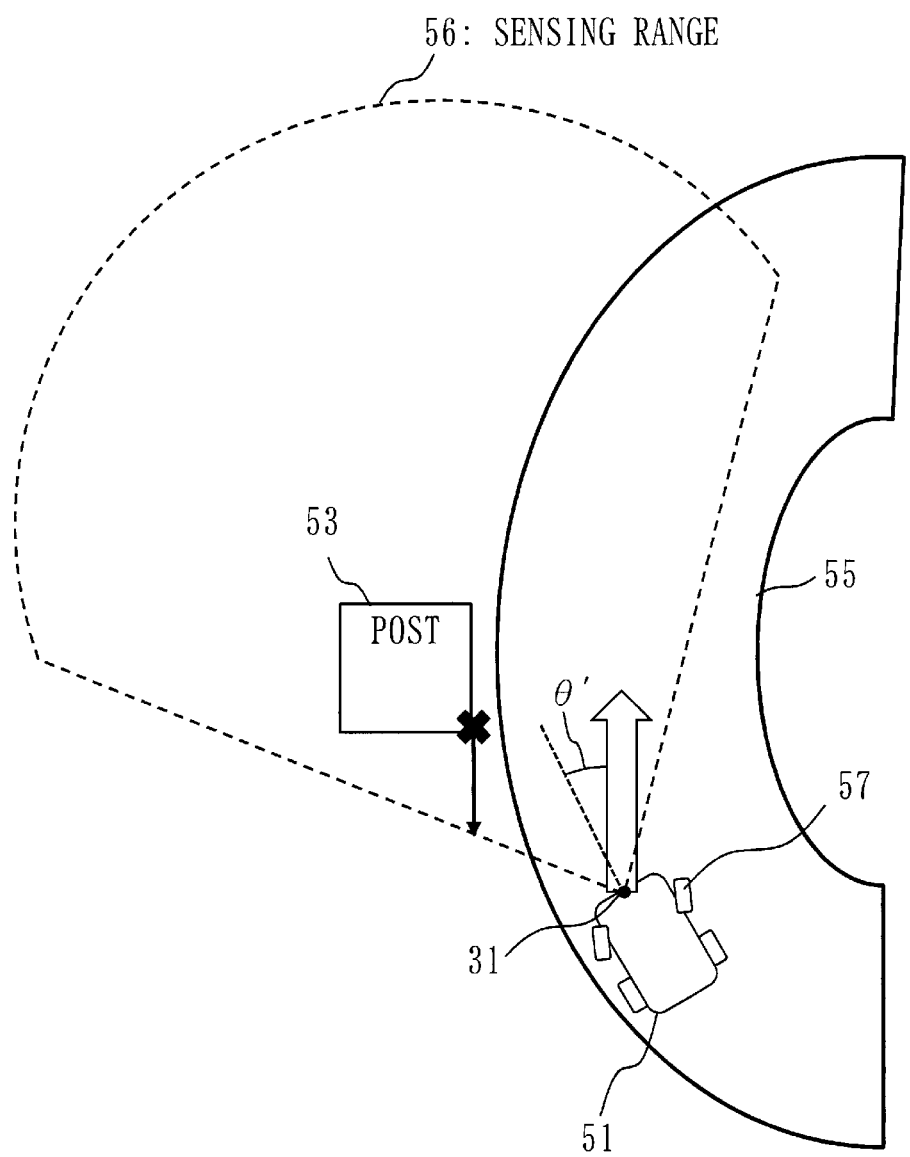
FIG. 11 is an explanatory diagram of a case where a road 55 is curved.
Figure 12:
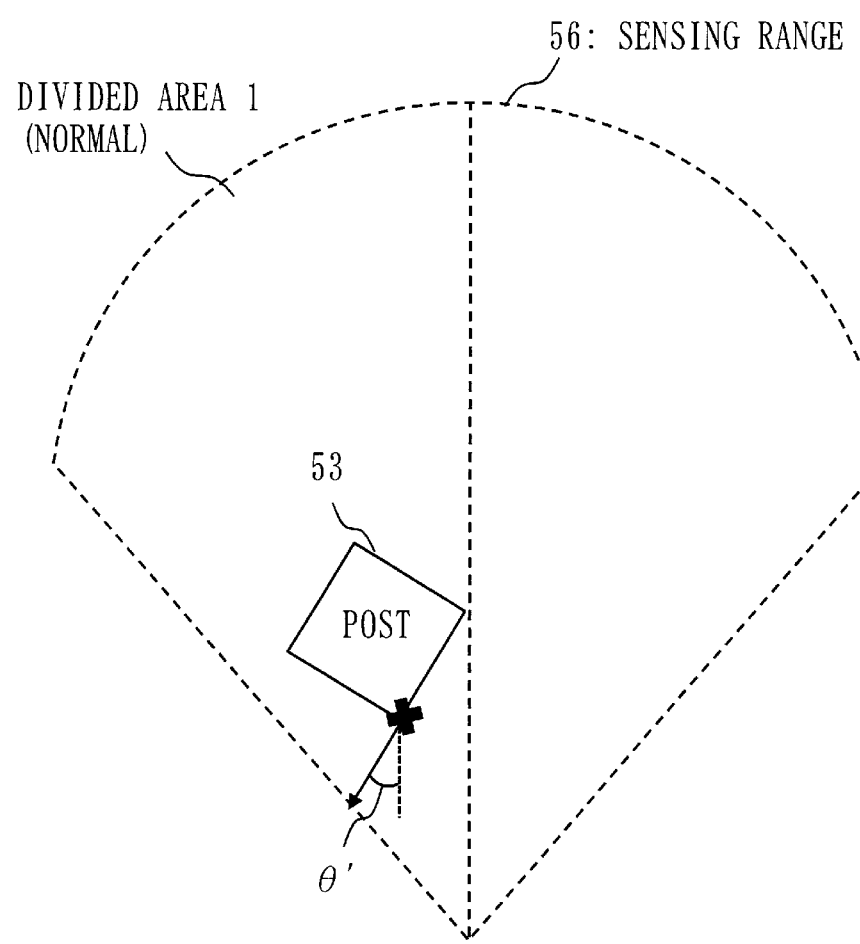
FIG. 12 is an explanatory diagram of failure determination results in the situation of FIG. 11.

A case where the road 55 traveled by the vehicle 51 is curved will be described with reference to FIGS. 11 and 12.

In the examples described with reference to FIGS. 3 to 8, the road 55 traveled by the vehicle 51 is straight. However, there may be a case where the road 55 traveled by the vehicle 51 is curved. It is assumed here that the road 55 is curved to the right, as illustrated in FIG. 11. Then, a traveling direction 57 of the vehicle 51, which is obtained by acquiring steering angle information of the vehicle 51 and converting it into a tire angle of the vehicle 51, is a direction misaligned to the right by only the angle θ' with respect to the direction directly in front of the vehicle 51. Then, as illustrated in FIG. 12, from the viewpoint of the vehicle 51, the movement direction of the reflection point on the post 53 is misaligned by only the angle θ' with respect to the direction directly in front of the vehicle 51. That is, the movement direction of the reflection point on the post 53 is the direction opposite to the traveling direction 57 of the vehicle 51.

Therefore, if the movement velocity of the post 53 is the same as the movement velocity of the vehicle 51, the presence of detected data indicating the characteristics of the normal case is determined in step S4, and the operation of the sensor 31 is determined to be normal in step S5 for the divided area 1. That is, also in the case where the road 55 traveled by the vehicle 51 is curved, the sensor 31 is determined to be normal if a stationary object is detected correctly.

(Step S7 of FIG. 2: Notification Process)

The notification unit 24 outputs the result determined in step S5 or step S6 to the display device 33 via the communication interface 14, so as to be displayed. For example, if the presence of an anomaly is determined in step S6, the notification unit 24 displays the divided area or the like where the presence of the anomaly is determined by representation with graphics or text. In this way, the passenger such as the driver of the vehicle 51 is notified of the state of the sensor 31.

When the sensor 31 is used for a driving support function such as an emergency automatic braking function, the notification unit 24 may notify a device that realizes this function of the presence or absence of an anomaly of the sensor 31. This allows measures, such as stopping a part or the entirety of the driving support function, to be taken when the sensor 31 has an anomaly.

Note that in step S1, detected data output in the past reference period is acquired. That is, the determination in step S4 is performed not only using a result of sensing at a certain moment, but also using sensing results obtained in a period of, for example, a few minutes or so.

As described above, the sensor 31 detects various objects within and outside the road 55. However, depending on the situation, there is a moment when no object is detected at all. It is difficult to determine whether a failure has occurred in the sensor with only the result of this moment. On a typical road 55, various objects such as signs and roadside trees are encountered when traveling for a few minutes. Therefore, a period of a few minutes which is a sufficient time for detecting various objects such as signs and roadside trees is used as a reference period.

Effects of First Embodiment

As described above, the failure detection apparatus 10 according to the first embodiment determines whether detected data indicating the characteristics of a detected object indicated by normal data that is output when the sensor 31 is normal is included in the detected data in the past reference period. In this way, the failure determination unit 23 determines whether a failure has occurred in the sensor 31.

Therefore, an anomaly of the sensor can be detected without generating a model in advance.

In particular, the failure detection apparatus 10 according to the first embodiment determines whether detected data indicating the movement direction opposite to the movement direction of the moving body 100 and indicating the same movement velocity as the movement velocity of the moving body 100 is included in the detected data in the past reference period.

Therefore, a determination as to whether the sensor 31 is functioning properly can be made appropriately without generating a model in advance.

\*\*\*Other Configurations\*\*\*

<First Variation>

The first embodiment is described on the assumption that the sensor 31 is mounted on the front of the vehicle 51 and oriented directly in front of the vehicle 51. Therefore, the movement direction of a detected object detected by the sensor 31 can be used as it is in step S4.

However, depending on a sensor 31, there may be a case where the sensor 31 is mounted at a different position and oriented in a different direction. In this case, in step S4, the failure determination unit 23 uses the movement direction of a detected object detected by the sensor 31 after converting it in consideration of the position and orientation of mounting. For example, it is assumed that the sensor 31 is mounted on the front of the vehicle 51 and oriented obliquely. In this case, the failure determination unit 23 converts the movement direction of a detected object detected by the sensor 31 into an angle in the direction directly in front of the vehicle 51, based on the angle at which the sensor 31 is mounted with respect to the direction directly in front of the vehicle 51.

In this way, a determination as to whether the sensor 31 is functioning properly can be made appropriately.

<Second Variation>

In the first embodiment, the functional components are realized by software. As a second variation, however, the functional components may be realized by hardware. Differences in this second variation from the first embodiment will be described.

Figure 13:
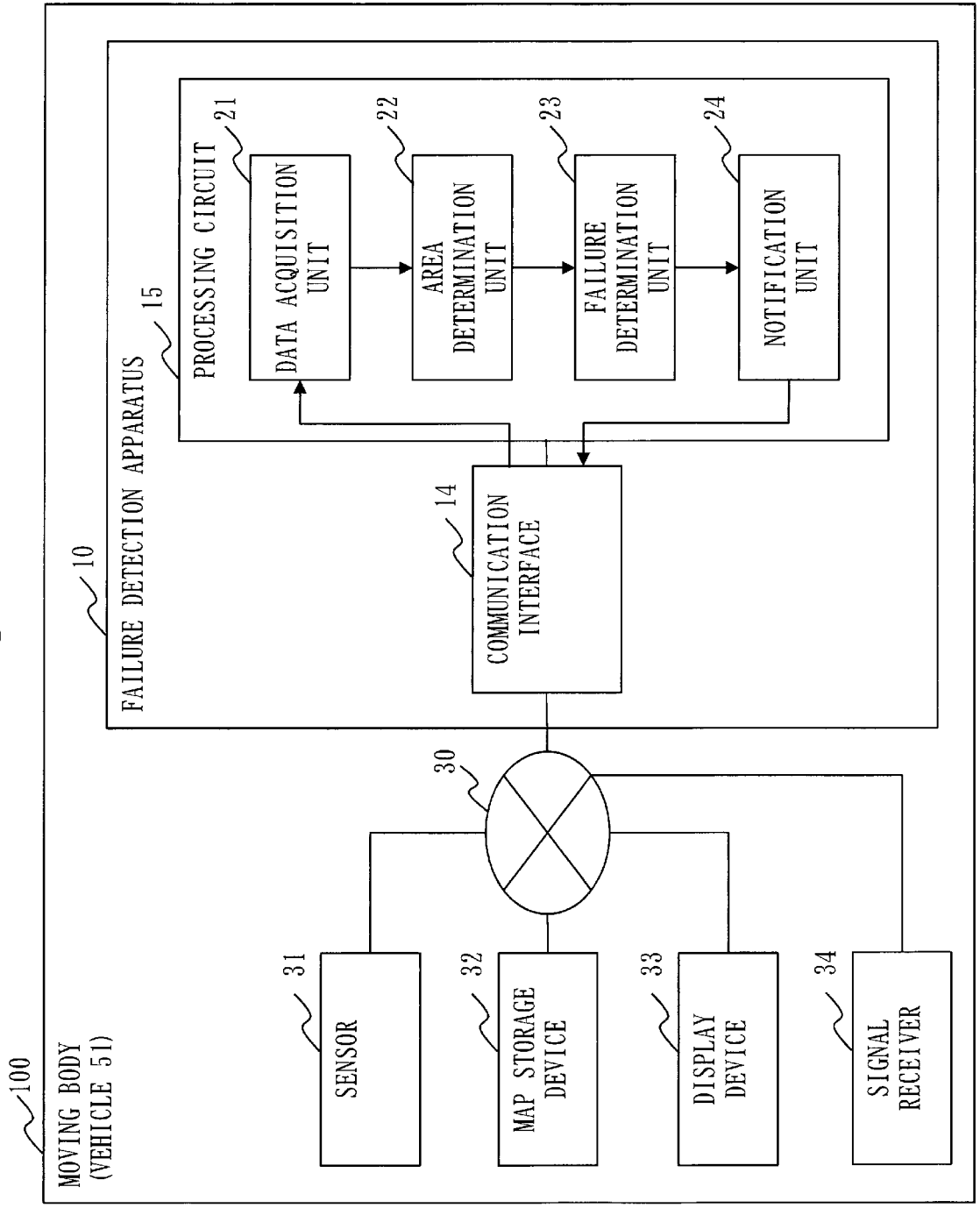
FIG. 13 is a configuration diagram of a failure detection apparatus 10 according to a second variation.

A configuration of a failure detection apparatus 10 according to the second variation will be described with reference to FIG. 13.

When the functional components are realized by hardware, the failure detection apparatus 10 has a processing circuit 15 in place of the processor 11, the memory 12, and the storage 13. The processing circuit 15 is a dedicated electronic circuit that realizes the functions of the functional components, the memory 12, and the storage 13.

The processing circuit 15 is assumed to be a single circuit, a composite circuit, a programmed processor, a parallel programmed processor, a logic IC, a gate array (GA), an application-specific integrated circuit (ASIC), or a field-programmable gate array (FPGA).

The functional components may be realized by one processing circuit 15, or the functional components may be realized by being distributed among a plurality of processing circuits 15.

<Third Variation>

As a third variation, some of the functional components may be realized by hardware, and the rest of the functional components may be realized by software.

The processor 11, the memory 12, the storage 13, and the processing circuit 15 are referred to collectively as "processing circuitry". That is, the functions of the functional components are realized by the processing circuitry.

REFERENCE SIGNS LIST

10: failure detection apparatus, 11: processor, 12: memory, 13: storage, 14: communication interface, 15: processing circuit, 21: data acquisition unit, 22: area determination unit, 23: failure determination unit, 24: notification unit, 31: sensor, 32: map storage device, 33: display device, 34: signal receiver, 51: vehicle, 52: vehicle, 53: post, 54: tree, 55: road, 56: sensing range, 57: traveling direction, 100: moving body

The invention claimed is:

1. A failure detection apparatus comprising:
processing circuitry to:
acquire, as detected data, sensor data output in a past reference period by a sensor mounted on a moving body;
determine whether a detected object included in the detected data is positioned outside a moving area where the moving body moves; and
based on the detected object being outside the moving area, determine whether a failure has occurred in the sensor, based on whether detected data indicating a characteristic of the detected object indicated by normal data, which is sensor data output when the sensor is normal, is included in the acquired detected data.

2. The failure detection apparatus according to claim 1, wherein the sensor data indicates a movement direction and a movement velocity of the detected object which are relative to the moving body, and
wherein the characteristic is a movement direction that is opposite to a movement direction of the moving body and a movement velocity that is same as a movement velocity of the moving body.

3. The failure detection apparatus according to claim 1, wherein the processing circuitry determines whether a failure has occurred in the sensor for each divided area obtained by dividing a sensing range of the sensor.

4. The failure detection apparatus according to claim 1, wherein the sensor data indicates a position of the detected object,
wherein the processing circuitry determines, for the acquired detected data, whether the position of the detected object is outside the moving area where the moving body moves, and
determines whether a failure has occurred in the sensor, based on whether detected data indicating the characteristic is included in the detected data determined to indicate that the position of the detected object is outside the moving area.

5. The failure detection apparatus according to claim 4, wherein the moving body is a vehicle, and
the moving area is a road on which the vehicle travels.

6. The failure detection apparatus according to claim 4, wherein the processing circuitry compares a position of the moving area indicated by map data or a position of the moving area detected by a camera with the position of the detected object indicated by the detected data, so as to determine whether the position of the detected object is outside the moving area.

7. The failure detection apparatus according to claim 1, wherein the processing circuitry notifies about the sensor for which occurrence of a failure has been determined.

8. The failure detection apparatus according to claim 1, wherein the processing circuitry refrains from determining whether the failure has occurred in the sensor based on the detected object not being outside the moving area.

9. The failure detection apparatus according to claim 1, wherein the processing circuitry determines whether the detected object is positioned outside the moving area by measuring a relative velocity of the detected object with respect to an acquired velocity of the moving body.

10. A failure detection method comprising:
acquiring, as detected data, sensor data output in a past reference period by a sensor mounted on a moving body;
determining whether a detected object included in the detected data is positioned outside a moving area where the moving body moves; and
based on the detected object being outside the moving area, determining whether a failure has occurred in the sensor, based on whether detected data indicating a characteristic of the detected object indicated by normal data, which is sensor data output when the sensor is normal, is included in the acquired detected data.

11. A non-transitory computer readable medium storing a failure detection program causing a computer to execute:
a sensor data acquisition process to acquire, as detected data, sensor data output in a past reference period by a sensor mounted on a moving body;
an area determination process to determine whether a detected object included in the detected data is positioned outside a moving area where the moving body moves; and
based on the detected object being outside the moving area, a failure determination process to determine whether a failure has occurred in the sensor, based on whether detected data indicating a characteristic of the detected object indicated by normal data, which is sensor data output when the sensor is normal, is included in the detected data acquired by the sensor data acquisition process.

* * * * *